United States Patent

[11] 3,626,414

[72] Inventor Jacob E. Valstar
Orange, Calif.
[21] Appl. No. 779,943
[22] Filed Nov. 29, 1968
[45] Patented Dec. 7, 1971
[73] Assignee North American Rockwell Corporation

[54] DOPPLER PROCESSING APPARATUS AND METHOD
7 Claims, 4 Drawing Figs.

[52] U.S. Cl. .................................................... 343/8, 343/9
[51] Int. Cl. ...................................................... G01s 9/46
[50] Field of Search ........................................... 343/8, 9, 5 DP; 244/3.19, 3.20

[56] References Cited
UNITED STATES PATENTS

| | | | |
|---|---|---|---|
| 3,131,390 | 4/1964 | Condie et al. | 343/8 |
| 3,140,482 | 7/1964 | Duncan et al. | 343/8 X |
| 3,214,575 | 10/1965 | Seliger et al. | 343/8 |
| 3,414,899 | 12/1968 | Buell | 343/9 |

*Primary Examiner*—Malcolm F. Hubler
*Attorneys*—William R. Lane, L. Lee Humphries and Rolf M. Pitts ABSTRACT: In a doppler processor system including an inertial guidance platform and a coherent radar having an azimuthally scanning antenna, the scan rate of which is substantially constant over all portions of the scan region, computing means for computing the on-boresight doppler velocity $V_{fd}$ and the time rate of change of the doppler velocity $V_{fd}$ whereby the use of function potentiometers mounted on the radar antenna gimbal system is avoided, and increased utilization is made of an onboard computer. Direction matrix conversion computing means, responsive to said radar and to said inertial platform, provides a first and second output corresponding to a respective one of a preselected derivative of the doppler velocity and the product $sE_{AN}V_{zRAD}$, where:

$sE_{AN}$ = sine of the antenna elevation angle
$V_{zRAD}$ = platform velocity resolved in the coordinates of the radar system.

A first analog integrator responsive to said first output of the computing means provides a signal indicative of $V_{fd}$; and signal combining means having a first and second input, responsive to a respective one of said second output of the computing means and to the double integral with respect to time of the first output of the computing means, provides a signal indicative of $V_{fd}$.

3,626,414

DOPPLER PROCESSING APPARATUS AND METHOD

CROSS-REFERENCES TO RELATED APPLICATIONS

1. U.S. application Ser. No. 670,363 filed Sept. 25, 1967 by Charles L. Vehrs, Jr., for Digital doppler Processor.
2. U.S. application Ser. No. 747,781 filed Aug. 25, 1968 by Jerome M. Page for Prediction Computation for Weapon Control.

BACKGROUND OF THE INVENTION

The application of doppler processing techniques to a coherent radar system is known in the art, the description of a digital doppler processor therefor being more fully described in copending U.S. application Ser. No. 670,363 filed Sept. 25, 1967 by C. L. Vehrs, Jr., assignor to North American Rockwell Corporation, assignee of the subject invention. Such reference describes the application of such a doppler processor to air-to-air modes, in which a range-gated clutter-referenced video receiver signal is doppler processed by digital means to distinguish a moving target of interest from a clutter background, the velocity of the radar platform being resolved along the antenna boresight axis, corresponding to the reference clutter velocity $V_{fd}$ or clutter centroid doppler frequency $fd$. Other doppler frequencies are predicted or calculated by means of integration upon a rate of change factor, $\Delta Fd$.

The application of a radar to a high-performance target-tracking system for fire control purposes, in which vector smoothing or filtering of the target is provided in conjunction with iterative digital computing means and an inertial guidance platform is described in copending U.S. application Ser. No. 747,781 filed Aug. 25, 1968, by Jerome M. Page, assignor to North American Rockwell Corporation, assignee of the subject application.

In the cooperation of such radar, iterative digital computing means and inertial guidance platform in a modern avionics weapon system, the utilization of the data of one subsystem by another subsystem of such avionics system usually involves the transformation of such data from the coordinate system of a sensing subsystem to the coordinate system of the utilizing subsystem. For example, the own ships motion data of the inertial guidance system must be transformed into that of the radar system in order to be utilized by the radar system, and the radar system data may require to be transformed from the coordinates of the radar antenna, to those of the radar system relative to the aircraft, and thence to the stabilized coordinate system of the inertial platform.

In the past, the data conversion between the coordinates of the radar system and the body axes of the utilizing aircraft has been effected by means of analog computing means comprising cosine and sine function potentiometers mounted on the gimbals of the gimballed radar system. However, such analog computing means have a limited operational life due to the mechanical wear and tear involved in the use thereof, and represent additional equipment cost and complexity. Accordingly, the avoidance of such equipment is to be preferred but heretofore has not been achieved.

SUMMARY

By means of the concept of the subject invention, coordinate transformation of data in an air-to-air mode radar doppler processor is effected by increased utilization of the onboard avionics computer, whereby the use of function potentiometers mounted on the radar gimbal system is avoided.

In a preferred embodiment of the invention there is provided a doppler processor for airborne use in tracking airborne moving targets and including an inertial guidance platform, and a coherent radar having an azimuthally scanning antenna, the scan rate of which is substantially constant over all portions of the scan region. There is also included computing means for computing the on-boresight doppler velocity $V_{fd}$ and the time rate of change $v_{\Delta fd}$ of the doppler velocity and comprising direction matrix conversion computing means responsive to the radar and to the inertial platform for providing a first and second output corresponding to a respective one of a preselected derivative of the doppler velocity and the product $sE_{AN}V_{zRAD}$, where:
$sE_{AN}$ = sine of the antenna elevation angle
$V_{zRAD}$ = platform velocity resolved in the coordinates of the radar system A first analog integrator responsive to said first output of the computing means provides a signal indicative of $v_{\Delta fd}$, and signal combining means having a first and second input, responsive to a respective one of said second output of the computing means and to the double integral with respect to time of the first output of said computing means, provides a signal indicative of $V_{fd}$.

Accordingly, it is an object of the invention to provide improved means for doppler processing in a weapon system radar.

It is another object to provide increased utilization of the computing means of an avionics weapon system whereby analog equipment economies may be effected.

A still further object is to provide a doppler processing mechanization of reduced equipment complexity and improved reliability.

These and further objects will become apparent from the following description, taken together with the accompanying drawings, in which:

DESCRIPTION OF THE DRAWINGS

In the FIGS. like reference characters refer to like parts.

DESCRIPTION OF THE PREFERRED EMBODIMENTS

Figure 1:
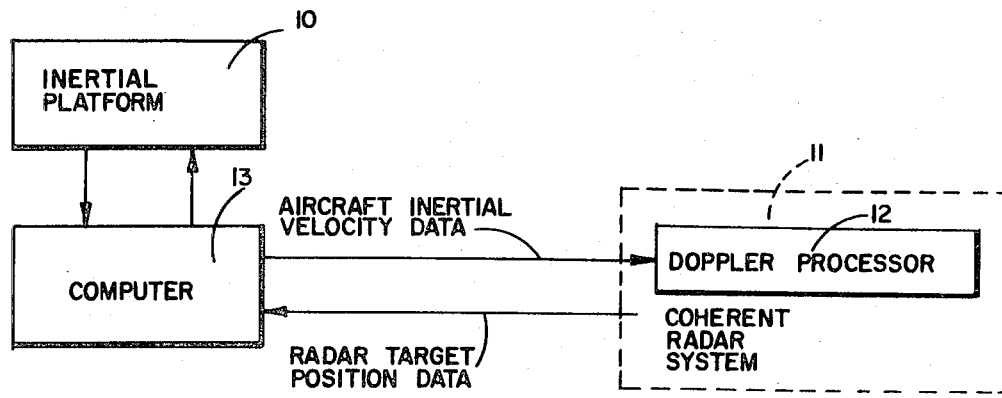
FIG. 1 is a block diagram of a system in which the concept of the invention may be advantageously employed.

In an attack radar with doppler processing, the aircraft velocity component in the direction of the radar beam ($V_{fd}$) and its first derivative ($v_{\Delta fd}$) are required. The velocity component in the direction of the radar beam, determined from the azimuth ($\psi_{AN}$) and elevation ($E_{AN}$) of the radar antenna, can be computed from the airframe inertial or rigid body velocities by proper Euler angle transformations. The several coordinate systems involved are:

1. The platform (inertial) coordinates, in which the platform X-axis points north (except for a small wander angle $\alpha$), the Y-axis is horizontal, and the Z-axis is vertically upward.
2. Airframe body coordinates in which the X-axis points forward according to the fuselage reference line (FRL), the Y-axis is perpendicular to both the X-axis and the plane of symmetry with the positive axis on the right, and the Z-axis is in the plane of symmetry and is perpendicular to both the X- and Y-axes with the positive sense downward.
3. The radar X-, Y-, and Z-axes, obtained by rotation from the body coordinates through the radar roll and pitch axes.
4. The radar $i$, $j$ and $k$ coordinates, obtained by rotation from the radar $x$, $y$, $z$ coordinates through radar azimuth ($\psi_{AN}$) and tilt or elevation ($E_{AN}$) angles, the radar -axis corresponding to the antenna boresight axis. The complete velocity transformation from inertial coordinates ($V_{xI}$, $V_{yI}$, $V_{zI}$) to radar $i$, $j$, $k$ coordinates ($V_{iRAD}$, $V_{jRAD}$, $V_{kRAD}$) may be represented in matrix form (with sine and cosine functions abbreviated respectively as $s$ and $c$):

$$\begin{bmatrix} V_{iRAD} \\ V_{jRAD} \\ V_{kRAD} \end{bmatrix} = \begin{bmatrix} cE_{AN} & 0 & -sE_{AN} \\ 0 & 1 & 0 \\ sE_{AN} & 0 & cE_{AN} \end{bmatrix} \cdot \begin{bmatrix} c\psi_{AN} & s\psi_{AN} & 0 \\ -s\psi_{AN} & c\psi_{AN} & 0 \\ 0 & 0 & 1 \end{bmatrix}$$

$$\begin{bmatrix} cP_{RAD} & 0 & -sP_{RAD} \\ 0 & 1 & 0 \\ sP_{RAD} & 0 & cP_{RAD} \end{bmatrix} \cdot \begin{bmatrix} 1 & 0 & 0 \\ 0 & cR_{RAD} & sR_{RAD} \\ 0 & -sR_{RAD} & cR_{RAD} \end{bmatrix}$$

$$\cdot \begin{bmatrix} 1 & 0 & 0 \\ 0 & cR & sR \\ 0 & -sR & cR \end{bmatrix} \begin{bmatrix} cP & 0 & -sP \\ 0 & 1 & 0 \\ sP & 0 & cP \end{bmatrix}$$

$$\cdot \begin{bmatrix} c\psi_p & s\psi_p & 0 \\ -s\psi_p & c\psi_p & 0 \\ 0 & 0 & 1 \end{bmatrix} \begin{bmatrix} 1 & 0 & 0 \\ 0 & -1 & 0 \\ 0 & 0 & -1 \end{bmatrix} \begin{bmatrix} V_{xI} \\ V_{yI} \\ V_{zI} \end{bmatrix} \quad (1)$$

wherein:

$$\psi_p = \psi_T + \alpha \quad (2)$$

Such matrix representation may be represented by three component matrices, employing the radar X-, Y-, Z-axis velocity components ($V_{xRAD}$, $V_{yRAD}$, $V_{zRAD}$) and the body axis velocity components ($V_{xb}$, $V_{yb}$, $V_{zb}$), a shorthand rotation being employed for each angle function matrix:

$$\begin{bmatrix} V_{iRAD} \\ V_{jRAD} \\ V_{kRAD} \end{bmatrix} = [E_{AN}] \cdot [\psi_{AN}] \cdot \begin{bmatrix} V_{xRAD} \\ V_{yRAD} \\ V_{zRAD} \end{bmatrix} \quad (3)$$

$$\begin{bmatrix} V_{xRAD} \\ V_{yRAD} \\ V_{zRAD} \end{bmatrix} = [P_{RAD}] \cdot [R_{RAD}] \cdot \begin{bmatrix} V_{xb} \\ V_{yb} \\ V_{zb} \end{bmatrix} \quad (4)$$

$$\begin{bmatrix} V_{xb} \\ V_{yb} \\ V_{zb} \end{bmatrix} = [R] \cdot [P] \cdot [\psi_p] \cdot [\pi] \begin{bmatrix} V_{xI} \\ V_{yI} \\ V_{zI} \end{bmatrix} = |C_{jk}| \cdot \begin{bmatrix} V_{xI} \\ V_{yI} \\ V_{zI} \end{bmatrix} \quad (5)$$

where:

$$[C_{jk}] = [R] \cdot [P] [\psi_p] \cdot [\pi] \quad (5a)$$

The prior art analytical geometry of the classical principles of such Euler angle transformations from inertial coordinates to aircraft body axis coordinates, and from aircraft body axis coordinates to radar antenna coordinates are more fully set forth in Sections 14.10-4, et seq. (pp. 473–483) of the text, *Mathematical Handbook for Scientists and Engineers*, by Korn and Korn (Second Edition), published by McGraw-Hill (1961).

In prior art fire control radar systems employing doppler processing, the transformation from platform (inertial) coordinates to radar $x$, $y$, $z$ coordinates (e.g., solution of equations (4) and (5)) is performed in an on-board digital computer, while the transform from radar $x$, $y$, $z$ coordinates to radar $i, j, k$ coordinates is performed in the radar circuitry.

The complete transformation from platform (inertial) coordinates to radar $x$, $y$, $z$ coordinates (corresponding to solution of equations (4) and (5)) may be represented generally as:

$$\begin{bmatrix} V_{xRAD} \\ V_{yRAD} \\ V_{zRAD} \end{bmatrix} = [P_{RAD}] \cdot [R_{RAD}] \cdot [C_{jk}] \cdot \begin{bmatrix} V_{xI} \\ V_{yI} \\ V_{zI} \end{bmatrix} \quad (6)$$

The $C_{jk}$ matrix, as defined in equation (5a) above, is currently employed in prior art on-board computer mechanizations, while the $[P_{RAD}] \cdot [R_{RAD}]$ form can be stored as a single matrix:

$$[P_{RAD}] \cdot [R_{RAD}] = \begin{bmatrix} cP_{RAD} & sP_{RAD}sR_{RAD} & -sP_{RAD}cR_{RAD} \\ 0 & cR_{RAD} & sR_{RAD} \\ sP_{RAD} & -cP_{RAD}sR_{RAD} & cP_{RAD}cR_{RAD} \end{bmatrix} = [C_{ki}] \quad (7)$$

Substituting equation (7) in equation (6):

$$\begin{bmatrix} V_{xRAD} \\ V_{yRAD} \\ V_{zRAD} \end{bmatrix} = [C_{ki}] \cdot [C_{jk}] \cdot \begin{bmatrix} V_{xI} \\ V_{yI} \\ V_{zI} \end{bmatrix} \quad (6a)$$

In the further transformation of the resolved own-ship velocity from radar $x$, $y$, $z$ coordinates to radar $i, j, k$ coordinates (corresponding to the solution of equations (3) above), the velocity component of interest is $V_{iRAD}$, the own ship velocity component, resolved along the antenna boresight and corresponding to $V_{fd}$:

$$\begin{bmatrix} V_{iRAD} \\ V_{jRAD} \\ V_{kRAD} \end{bmatrix} = \begin{bmatrix} cE_{AN}c\psi_{AN} & cE_{AN}s\psi_{AN} & -sE_{AN} \\ -s\psi_{AN} & c\psi_{AN} & 0 \\ sE_{AN}c\psi_{AN} & sE_{AN}s\psi_{AN} & cE_{AN} \end{bmatrix} \cdot \begin{bmatrix} V_{xRAD} \\ V_{yRAD} \\ V_{zRAD} \end{bmatrix} \quad (8)$$

Solving equation (8) for $V_{iRAD}$:

$$V_{Fd} = V_{iRAD} = cE_{AN} c\psi_{AN} V_{xRAD} + cE_{AN} s\psi_{AN} V_{yRAD} - sE_{AN} V_{zRAD} \quad (9)$$

$V_{\Delta fd}$, the partial derivative of $V_{fd}$ with respect to $\psi_{AN}$, is of interest during azimuth scanning and may be obtained by differentiation with respect to $\psi_{AN}$:

$$V_{\Delta fd} = (-cE_{AN} s\psi_{AN} V_{xRAD} + cE_{AN} c\psi_{AN} V_{yRAD}) \dot{\psi}_{AN} \quad (10)$$

The rates of change of $\psi_{AN}$ are normally too high to solve equations (9) and (10) in state of the art digital computers at a sufficient iteration rate to assure sufficient accuracy. Hence, these equations have been heretofore solved in radar-connected analog devices which include sine-cosine function potentiometers attached to the antenna and related circuitry.

Although neither of equations (9) and (10) can be processed in the digital computer at a rate sufficient to provide adequate doppler compensation, it is possible to perform an alternate computation which is both adequate for such purposes and compatible with the computation rate of the computer. Such technique takes advantage of a constant azimuthal scanning rate, wherein $|\dot{\psi}_{AN}|$ is fixed. First, equation (9) is rearranged for convenience:

$$V_{fd} = (cE_{AN} V_{xRAD}) c\psi_{AN} + (cE_{AN} V_{yRAD}) s\psi_{AN} - (sE_{AN} V_{zRAD}) \quad (11)$$

Then (recalling that $|\dot{\psi}_{AN}|$ is a constant), the derivative ($V_{\Delta fd}$) of $V_{fd}$ with respect to $\psi_{AN}$ may be represented as:

$$V_{\Delta fd} = (-cE_{AN} V_{xRAD} \dot{\psi}_{AN}) s\psi_{AN} + (cE_{AN} V_{yRAD} \dot{\psi}_{AN}) c\psi_{AN} \quad (12)$$

The parameter $V_{fd}$, as a continuous function of time, may then be determined by analog integration as the sum of (1) a sampled one of a digitally computed value $(V_{fd})_{t_n}$ (sampled at time, $t_n$) and (2) the analog integral with respect to time of $V_{\Delta fd}$ during the interval between successive intermittent digital computations of $(V_{fd})_{t_n}$:

$$V_{fd}(t) = (V_{fd})_{t_n} + \int_{t_n}^{t} V_{\Delta fd} dt \quad (13)$$

In this way several sine-cosine resolvers and associated analog circuitry may be eliminated from the radar system mechanization. By performing the bracketed computations of equations (11) and (12) in the computer, the sine-cosine resolvers of the elevation (tilt) axis of the radar system may be eliminated; while the solution of equation (10) in the computer and extrapolation of $V_{fd}$ (by real time analog integration of $V_{\Delta fd}$) permits elimination of one sine-cosine resolver on the azimuth axis. Elimination of both sine-cosine resolvers on the azimuth axis (together with the sine-cosine resolvers on elevation axis) may be accomplished by several alternative computation arrangements, utilizing a fixed azimuthal antenna scan rate and shown generally in FIG. 1.

Referring to FIG. 1, there is illustrated in block diagram form, a system in which the concept of the invention may be advantageously employed, and comprising an inertial guidance platform 10 and a coherent radar system 11 having a doppler processor 12 in cooperation with a digital computer 13, radar system 11 having a constant azimuthal scan rate. In such an arrangement, the second derivative ($V_{\Delta 2fd}$) of $V_{fd}$ may be conveniently employed, being easily computed as the differentiation of $V_{\Delta fd}$ with respect to time, for a constant value of $|\dot{\psi}_{AN}|$:

$$V_{\Delta 2fd} = (cE_{AN} c\psi_{AN} V_{xRAD} - cE_{AN} s\psi_{AN} V_{yRAD}) \dot{\psi}^2_{AN} \quad (14)$$

$V_{\Delta 2fd}$ may be computed at low cost (in terms of computer memory and computation time) by employing essentially the same parameters employed in computing $V_{\Delta fd}$. Thus, intermittent values of $V_{fd}$, $V_{\Delta 2fd}$ may be presented by the computer, with continuous values of $V_{\Delta fd}$ and $V_{fd}$ being obtained from respective integrations of the intermittent values of $V_{\Delta 2fd}$ and $V_{\Delta fd}$, respectively. A term like the term $sE_{AN} V_{zRAD}$ (in equation 9)) varies slowly, and thus can be treated as a constant between computer iterations. Accordingly, in one exemplary mechanization, the variables $V_{\Delta fd}$ and $V_{fd}$ may be generated from $V_{\Delta 2fd}$ with two analog integrators as shown in FIG. 2.

Figure 2:
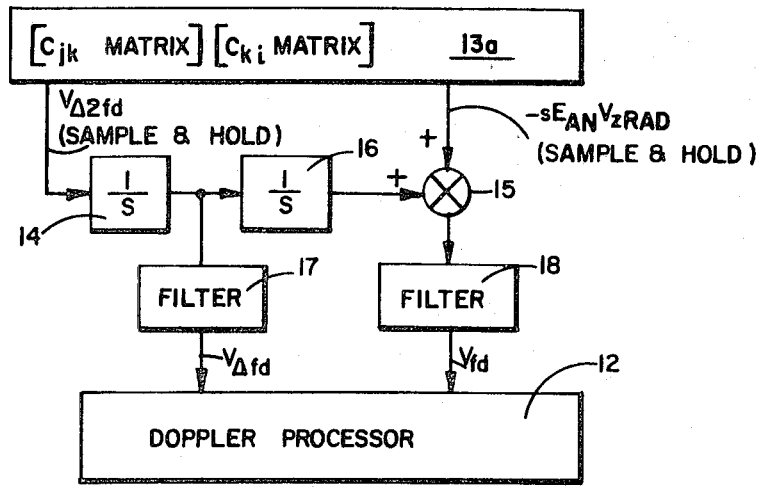
FIG. 2 is a block diagram of one aspect of the inventive concept.

Referring to FIG. 2, there is provided direction matrix conversion means 13a and analog computing means, corresponding to computer 13 of FIG. 1 and cooperating with doppler processor 12. Matrix computing means 13a is responsive to the inertial platform 10 and radar 11 of FIG. 1 for providing a first output corresponding to the solution of equation (14) and a signal output corresponding to the term $-(sE_{AN} V_{zRAD})$. A first analog integrator 14 responsive to the sampled-and-held first output of computing means 13a provides a signal indicative of $V_{\Delta fd}$, while signal combining means 15 having a first and second input responsive to a respective one of the second output of computing means 13a and the double integral (with respect to time) of the first output of computing means 13a, for computing $V_{fd}$. Such double integral is provided by a second analog integrator 16 responsively coupled to an output of first integrator 14. Resetting of the integrators 14 and 16 is synchronized with the digital computer solution (sample and hold) rate by means well understood in the art, as is indicated more fully for example in Chapter 7 of the text "Electronic Analog Computers" by Korn and Korn, second edition, published by McGraw-Hill Book Company (1956).

The output of integrator 16, corresponding to the double integral of equation (14), is seen to also correspond to the first two products or function of $\psi_{AN}$ in the right hand member of equation (10):

function $(\psi_{AN}) = cE_{AN} c\psi_{AN} V_{zRAD} + cE_{AN} s\psi_{AN} V_{vRAD}$ (15)

The combination of equation (15) and the expression, $(-sE_{AN} V_{zRAD})$, corresponding to the two inputs to summing means 15, is thus seen to correspond to equation (10) for the solution of $V_{fd}$:

function $(\psi_{AN}) - sE_{AN} V_{zRAD} = cE_{AN} c\psi V_{zRAD} + cE_{AN} s\psi_{AN} V_{vRAD} - sE_{AN} V_{zRAD}$ (16)

Substituting the left-hand member of equation (9) for the right-hand member of equation (16):

function $(\psi_{AN}) - sE_{AN} V_{zRAD} = V_{fd}$ (17)

Thus, the exemplary mechanization of FIG. 2 is seen to provide continuously extrapolated analog signals indicative of the doppler velocity $V_{fd}$ (corresponding to the vehicle velocity resolved along the radar antenna boresight) and the rate of change of doppler velocity $V_{\Delta fd}$. The effects of the synchronous resetting of integrators 14 and 16 and the sample-and-hold presentation of computer 13a may be preferrably smoothed by means of low-pass filters 17 and 18 (each having a cutoff frequency not exceeding the frequency of such synchronous operation).

Figure 3:
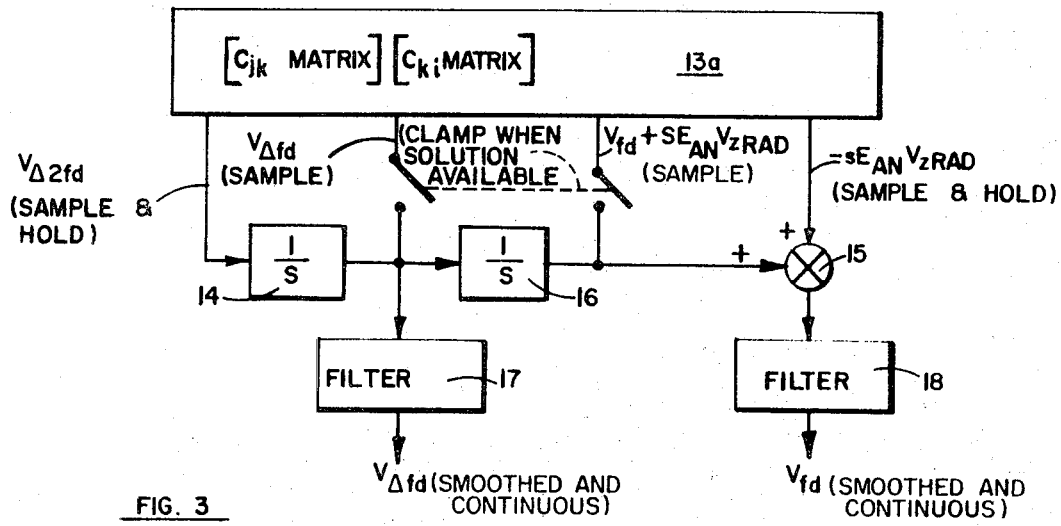
FIGS. 3 and 4 are block diagrams of alternative embodiments of the invention.
Figure 4:
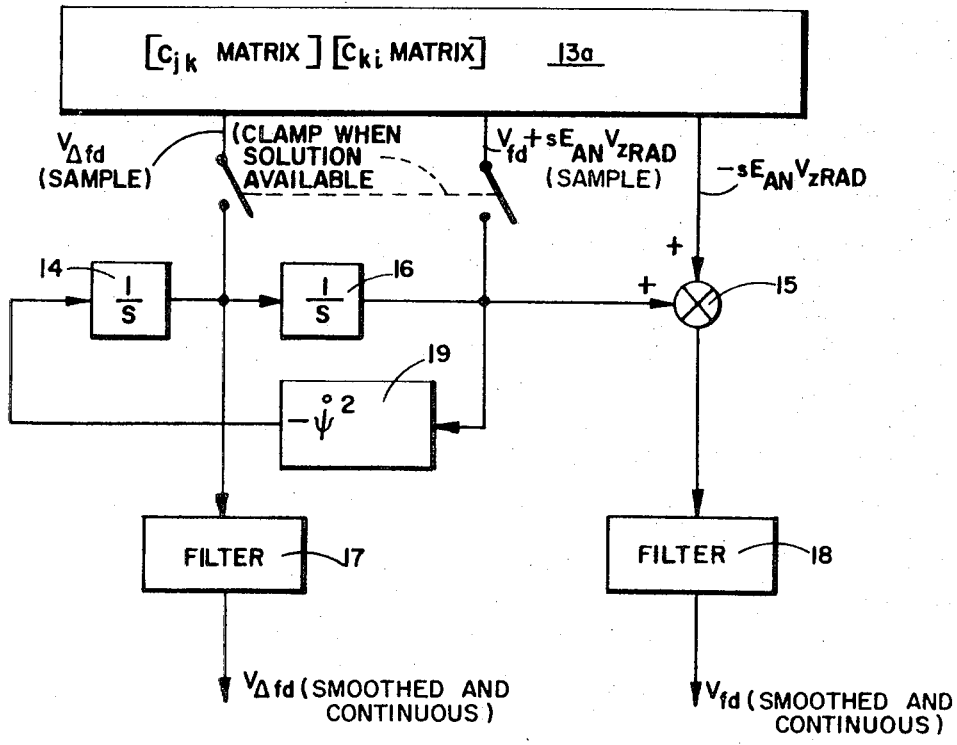

Alternative mechanizations of such analog-interpolated sampled calculations of $V_{fd}$ and $V_{\Delta fd}$, and which are less sensitive to integrator drift, are shown in FIGS. 3 and 4.

Referring to FIG. 3, there is illustrated computer 13a, integrators 14 and 16, summing means 15 and filters 17 and 18, all arranged to cooperate substantially the same as the like referenced elements of FIG. 2. Computer 13a, however, also provides two additional outputs to those utilized in the arrangement of FIG. 2: a clamped third output indicative of sampled solutions for $V_{\Delta fd}$, and a clamped fourth output indicative of sampled values for the function $(V_{fd} + sE_{AN} V_{zRAD})$. The intermittent sampled and clamped solutions for $V_{\Delta fd}$ from computer 13a correct for any drift in the performance of integrator 14 as to correct the input or initial conditions of integrator 16, while the perturbation effect of such intermittent computation (and of the synchronous resetting of integrator 14) is smoothed by filter 17, prior to utilization by the doppler processor (of FIG. 1). Similarly, the intermittent sampled and clamped solution for the function, $V_{fd} + sE_{AN} V_{zRAD}$, is combined with the sampled-and-held function, $-sE_{AN} V_{zRAD}$, by summing means 15 to provide an intermittent computed value for $V_{fd}$, as to correct the effects of drift in integrator 16. The perturbation effect of such intermittent correction of $V_{fd}$ and of the synchronous resetting of integrator 16, is smoothed by filter 18.

An alternate mechanization for reducing the effect of integrator drift and employing only three computation outputs is shown in FIG. 4.

Referring to FIG. 4 there is illustrated computing means 13a, first and second integrators 14 and 16, summing means 15, and first and second smoothing filters 17 and 18. Computer 13a generates the sampled and held function $(-sE_{AN} V_{zRAD})$ and the sampled and clamped functions $V_{\Delta fd}$ and $(V_{fd} + sE_{AN} V_{zRAD})$ provided in the arrangement of FIG. 3. The intermittent clamped solution for $V_{\Delta fd}$ is filtered by filter 17, while the intermittent solution of $V_{fd}$ formed by combining the clamped solution for $(V_{fd} + sE_{AN} V_{zRAD})$ and the sampled-and-held solution for $(-sE_{AN} V_{zRAD})$ by summing means 15, is smoothed by filter 18.

The arrangement of FIG. 4 is somewhat similar to that of FIG. 3, except that the input to integrator 14 is provided by the output of integrator 16, scaled by the scaling factor $(-\dot\psi^2_{AN})$. Extrapolated continuous values for $V_{fd}$, $V_{\Delta fd}$ and $V_{\Delta 2fd}$ may be provided continuously by means of a closed loop arrangement of synchronously-reset integrators 14 and 16, by making use of the fact that such functions are inter-related as sine and cosine functions of $\psi_{AN}$ and the further fact that the amplitude of $\dot\psi$ is constant. In other words, for a sinusoidal function:

$$f(t) = \sin \psi_{AN} \quad (\dot t = \sin \dot\psi_{AN} t) \quad (18)$$
$$df/dt = +\dot\psi_{AN} \cos \psi_{AN} t \quad (19)$$
$$d^2f/dt^2 = \dot\psi^2_{AN} \sin \psi_{AN} t, \quad (20)$$

the relative amplitude of the derivative varies as the frequency or time rate of change of the argument, while the second derivative varies as the square of the frequency.

Referring to equations (9), (10) and (14), for the respective determinations of $V_{fd}$, $V_{\Delta fd}$ and $V_{\Delta fd}$, it is seen that the bracketed term in equation (1) is the partial derivative of equation (9), and that the related amplitude of the periodic function of equation (10) to that of equation (9) is in the ratio $\dot\psi AN$; and that the bracketed term in equation (14) is the partial second derivative of equation (10), and that the amplitude ratio of such second derivative, $V_{\Delta 2fd}$, to the partial function for $V_{fd}$ is $(-\dot\psi^2_{AN})$.

Referring again to FIG. 4, the output of integrator 16 is seen to represent the integral of $V_{\Delta fd}$, and also the double integral of the input of integrator 14, which double integral, when scaled by the scaling factor $(-\dot\psi^2_{AnN})$, corresponds to the derivative function, $V_{\Delta 2fd}$. Thus, by so scaling the output of integrator 16 by scaling means 19 (such as an adjustable-gain, phase-inverting amplifier or the like), a signal corresponding to the partial second derivative $(V_{\Delta 2fd})$ of $V_{fd}$ is generated. Such partial second derivative may then be continuously interpolated by successive ones of serially interconnected integrators 14 and 16 to provide interpolated values for $V_{\Delta fd}$ and the partial function for $V_{fd}$ during the unclamped (nonsampling) intervals during which computer 13a is not providing the solutions $V_{\Delta fd}$ and $(V_{fd} + sE_{AN} V_{zRAD})$.

Accordingly, the closed loop integrator arrangement of FIG. 4 utilizes fewer computer solutions to effect compensation for integrator drift, while also providing continuous interpolations for $V_{fd}$ and $V_{\Delta fd}$ between the intervals of the computer solutions.

Thus, it is to be appreciated that means have been described for increased utilization of an onboard computer in a doppler processor, whereby analog sine and cosine function generators may be eliminated from the radar system, thus effecting economies in system equipment without sacrificing system functional integrity and accuracy.

Although the invention has been described and illustrated in detail, it is to be clearly understood that the same is by way of illustration and example only and is not to be taken by way of

I claim:

1. In a doppler processor system including an inertial guidance platform and a coherent radar having an azimuthally scanning antenna, the scan rate of which is substantially constant over all portions of the scan region, means for computing the on-boresight doppler velocity $V_{fd}$ and the time rate of change of the doppler velocity $V_{\Delta fd}$ and comprising direction matrix conversion computing means responsive to said radar and to said inertial platform for providing a first and second output corresponding to a respective one of a preselected derivative of the doppler velocity and the product $sE_{AN} V_{zRAD}$, where: $sE_{AN}$ = sine of the antenna elevation angle in the coordinates of the radar system;
$V_{zRAD}$ = platform velocity resolved in the coordinates of the radar system;

a first analog integrator responsive to said first output of said computing means for providing a signal indicative of $V_{\Delta fd}$; and signal combining means having a first and second input responsive to a respective one of said second output of said computing means and to a preselected integral with respect to time of said first output of said computing means for providing a signal indicative of $V_{fd}$.

2. The device of claim 1 in which said signal combining means includes said first analog integrator.

3. The device of claim 1 in which said signal combining means includes a second analog integrator responsively coupled to an output of said first analog integrator for generating said preselected integral of said first output of said integrating means.

4. The device of claim 1 in which said signal combining means comprises a second analog integrator responsively coupled to an output of said first integrator;

analog means responsive to an output of said second integrator and to said second output of said computing means for providing an output indicative of the analog sum thereof; and a first low-pass filter responsive to an output of said summing means and having a cutoff frequency not exceeding a sampling rate of said computing means.

5. The device claim 1 in which said computing means further provides a third and fourth periodically sampled output corresponding to a respective one of $V_{\Delta fd}$ and the sum $(V_{fd} + sE_{AN} V_{zRAD})$ of $V_{fd}$ and said product $sE_{AN} V_{zRAD}$, said third output of said computing means being coupled with said output of said first analog integrator, and said fourth output of said computing means being coupled to said second input of said signal combining means.

6. The device of claim 1 in which said computing means further provides a third and fourth periodically sampled output corresponding to a respective one of $V_{\Delta fd}$ and the sum $(V_{fd} + sE_{AN} V_{zRAD})$ of $V_{fd}$ and said product $sE_{AN} V_{zRAD}$, said third output of said computing means being coupled with said output of said first analog integrator, and said fourth output of said computing means being coupled to said second input of said signal combining means, and in which there is provided a first and second low-pass filter respectively responsive to a respective output of said signal combining means and said first analog integrator, each said filter having a cutoff frequency not exceeding a sampling rate of said computing means.

7. The device of claim 1 in which said computing means further provides a periodically sampled third output corresponding to the sum $(V_{fd} + sE_{AN} V_{zRAD})$ of the doppler velocity $V_{fd}$ and said product $sE_{AN} V_{zRAD}$, said third output being coupled with the output of said first analog integrator, and in turn there is further provided a second analog integrator responsive to said coupled to third output of said computing means and having an output coupled with said first output of said computing means; and a first and second low-pass filter respectively coupled to a respective output of said signal combining means and said second integrator, each said filter having cutoff frequency not in excess of the sampling rate of said computing means.

* * * * *